United States Patent
Ziegler-Millard et al.

(10) Patent No.: US 12,450,169 B2
(45) Date of Patent: Oct. 21, 2025

(54) CACHE WITH GUARANTEE OF CURRENT DATA

(71) Applicant: Dropbox, Inc., San Francisco, CA (US)

(72) Inventors: Adrian Ziegler-Millard, Kitchener (CA); Neil Burke, Nelson (CA); Akos Albert, Denver, CO (US); Panashe Fundira, Brooklyn, NY (US); Michael Coopersmith, Princeton, NJ (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/534,355

(22) Filed: Dec. 8, 2023

(65) Prior Publication Data

US 2025/0190364 A1 Jun. 12, 2025

(51) Int. Cl.
*G06F 12/12* (2016.01)
*G06F 1/10* (2006.01)

(52) U.S. Cl.
CPC ............... *G06F 12/12* (2013.01); *G06F 1/10* (2013.01)

(58) Field of Classification Search
CPC .................................. G06F 12/12; G06F 1/10
See application file for complete search history.

(56) References Cited

U.S. PATENT DOCUMENTS

| | | | |
|---|---|---|---|
| 5,463,753 A * | 10/1995 | Fry ..................... | G06F 12/0831 711/146 |
| 6,307,410 B1 * | 10/2001 | Matsui ..................... | G11C 7/22 327/212 |
| 6,496,944 B1 | 12/2002 | Hsiao et al. | |
| 6,546,473 B2 | 4/2003 | Cherkasova et al. | |
| 6,704,735 B1 * | 3/2004 | Salo ..................... | G06F 16/289 |
| 7,103,839 B1 * | 9/2006 | Natkin ................. | G11B 27/034 |
| 7,171,540 B1 * | 1/2007 | Seidl .................... | G06F 12/1045 710/305 |

(Continued)

FOREIGN PATENT DOCUMENTS

CN 111177159 A 5/2020

OTHER PUBLICATIONS

Parekh J., et al., "A Timestamp based Novel Caching Mechanism for Distributed Web Systems," International Journal of Computer Applications, Sep. 2020, vol. 175, No. 19, pp. 36-46, Retrieved from the Internet: URL: https://www.researchgate.net/publication/344300301_A_Timestamp_based_Novel_Caching_Mechanism_for_Distributed_Web_Systems.

(Continued)

*Primary Examiner* — Michael Krofcheck
(74) *Attorney, Agent, or Firm* — Polsinelli PC

(57) ABSTRACT

The present technology is a cache that provides an implied guarantee that data returned in response to a query is current. The cache uses two techniques together to guarantee that data returned in response to a query from the cache is current. The first technique is a guaranteed clock value. The is a clock value for which all changes that have occurred before it have been written to the authoritative database. Any query having a clock value greater than the guaranteed clock value is invalid. The second technique is a data invalidation technique, where the cache repeatedly polls the authoritative database for information about changes and invalidates objects associated with changes. If no change has happened, the cache can confidently conclude it is up to date since the cache knows that it is aware of all changes as of the guaranteed clock value.

20 Claims, 7 Drawing Sheets

(56) References Cited

U.S. PATENT DOCUMENTS

| | | | |
|---|---|---|---|
| 7,747,663 B2 | 6/2010 | Atkin et al. | |
| 8,478,936 B1 | 7/2013 | Todd et al. | |
| 9,043,372 B2 | 5/2015 | Makkar et al. | |
| 9,053,107 B1 | 6/2015 | Le | |
| 9,378,149 B1 | 6/2016 | Bonwick | |
| 9,898,498 B2 | 2/2018 | Tuatini et al. | |
| 10,430,398 B2 | 10/2019 | Molaro | |
| 2005/0210010 A1* | 9/2005 | Larson | G06F 16/2457 |
| 2012/0259821 A1* | 10/2012 | Alam | H04L 67/288 |
| | | | 707/E17.005 |
| 2013/0318191 A1* | 11/2013 | Yin | H04L 67/5682 |
| | | | 709/213 |
| 2019/0205050 A1* | 7/2019 | Koorapati | G06F 16/2379 |
| 2019/0294688 A1* | 9/2019 | Mohan | G06F 16/24552 |
| 2022/0284002 A1 | 9/2022 | Passey et al. | |

OTHER PUBLICATIONS

Sideway, "catbox API v12.1.x," hapi.dev [Online], Retrieved on Oct. 9, 2023, 9 pages, Retrieved from the Internet: URL: https://hapi.dev/module/catbox/api/?v=12.1.1.

* cited by examiner

CACHE WITH GUARANTEE OF CURRENT DATA

BACKGROUND

Caches have been traditionally used to quickly retrieve information associated with a data store, avoiding the need to make expensive, slow calls to the data store itself.

A cache is a specialized high-speed memory storage system that is designed to store frequently accessed data or instructions, allowing for faster access compared to accessing data from traditional main memory. Caches are commonly utilized in various computing systems to enhance overall performance by storing copies of frequently accessed data A cache stored in a data center is a specialized high-speed memory storage system designed to improve the performance and efficiency of data processing and retrieval in large-scale computing environments. Operating on similar principles as other caches, such as those found in CPUs, a data center cache serves as a middle layer between the data storage systems and the computing resources. In the context of a data center, where vast amounts of data are stored and accessed, caches play a vital role in accelerating data retrieval and reducing latency. They serve as a cache layer, storing frequently accessed data or metadata closer to the computing resources, preventing the need for continuous access to slower and more distant storage systems. The primary purpose of a cache in a data center setting is to optimize overall system performance by reducing the time taken to access frequently requested data. By storing copies of commonly accessed data sets or even entire databases, caches enable faster retrieval and processing, particularly for computationally intensive tasks, or high-demand applications. Data center caches are often implemented using technologies such as solid-state drives (SSDs) or high-speed random access memory (RAM). These technologies offer significantly faster read and write speeds compared to traditional storage systems, minimizing data access latency and improving system responsiveness.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
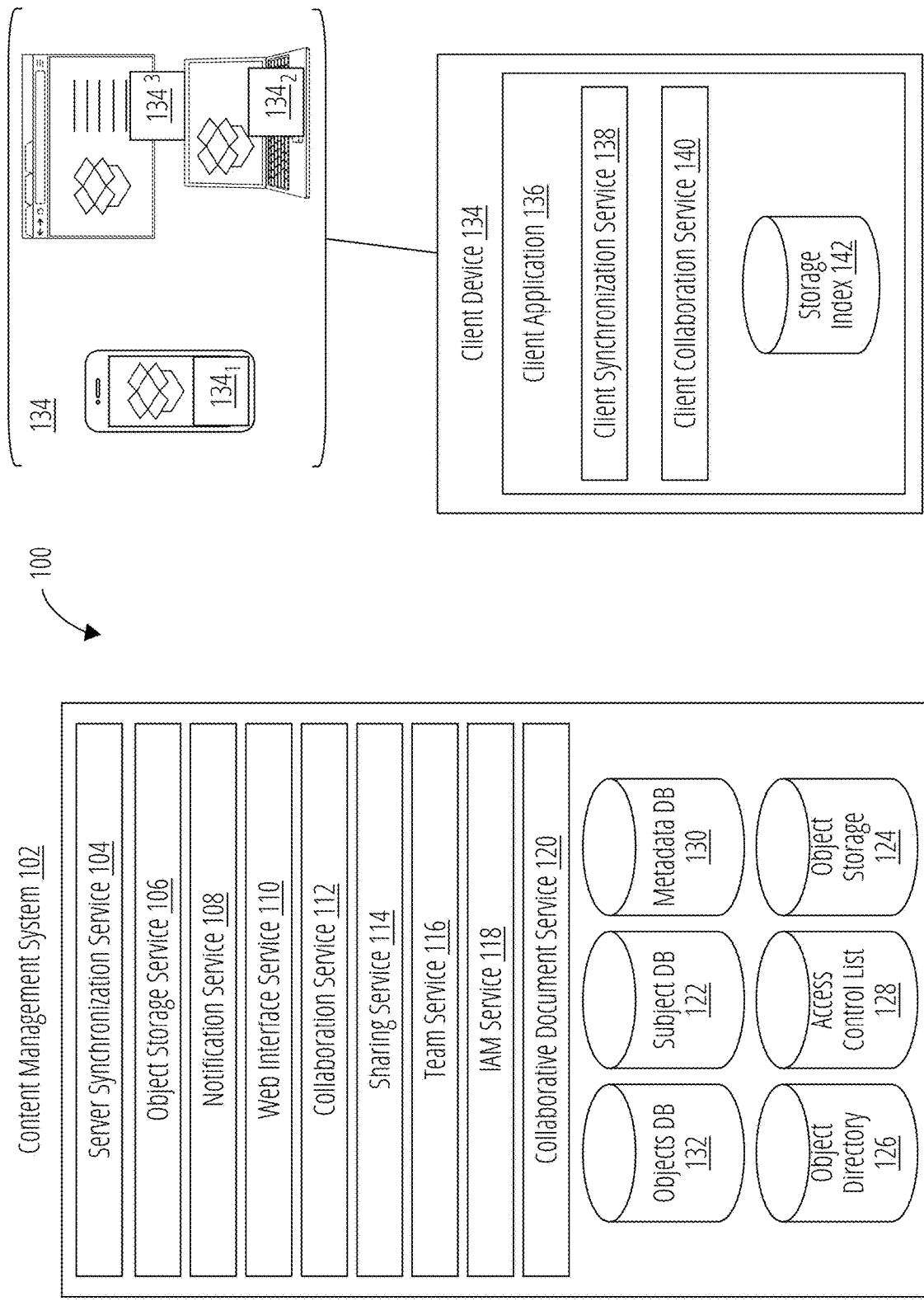
FIG. 1 illustrates an example of a content management system and client devices in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Caches have been traditionally used to quickly retrieve information associated with a data store, avoiding the need to make expensive, slow calls to the data store itself. A cache stored in a data center is a specialized high-speed memory storage system designed to improve the performance and efficiency of data processing and retrieval in large-scale computing environments. A data center cache serves as a middle layer between the data storage systems and the computing resources. In the context of a data center, where vast amounts of data are stored and accessed, caches play a vital role in accelerating data retrieval and reducing latency. They serve as a cache layer, storing frequently accessed data or metadata closer to the computing resources, preventing the need for continuous access to slower and more distant storage systems.

However, if the cache has stale data (e.g., expired data), the information retrieved may be inaccurate. While some caches try to mitigate the stale data problem using techniques such as cache invalidation, time-to-live (TTL) policies, and cache replacement algorithms, these strategies merely reduce the likelihood of accessing stale data in a cache. Traditional mechanisms cannot guarantee that the returned from a cache is current.

The present technology can provide such a guarantee; any data returned in response to a query from the cache is current. The present technology is a cache that can determine if the data in the cache is valid. Changes happen quickly in the authoritative database, so the cache needs to be able to tell if its data is current in an efficient manner. The cache uses two techniques together. The first technique is a guaranteed clock value, which is the most current clock value that the authoritative database has reported to the cache. The guaranteed clock value is not the same as a recent clock value, but rather the guaranteed clock value is a clock value for which all changes that have occurred before it have been written to the authoritative database. Any query having a clock value greater than the guaranteed clock value is invalid. The second technique is a data invalidation technique where that the cache repeatedly polls the authoritative database for information about changes to a root object (including any changes that have occurred under the root object). When the cache receives a request for an object, the cache can determine whether any changes have occurred to the root object above the requested object. If a change has happened, we can't be sure that the cache has the most recent data, so the existing data is invalidated, and the cache requests the data from the authoritative database. If no change has happened to the root object, the cache can confidently conclude it is up to date since the cache knows that it is aware of all changes under the root object as of the guaranteed clock value. Thus, the present technology can guarantee that data returned in response to queries that pertain to a clock value that is before the guaranteed clock value are current data.

Implementing the guaranteed clock value in the context of a cache is a non-trivial technical problem because it requires an authoritative database to both have a guaranteed clock value and to expose the guaranteed clock value to the cache. Accordingly, another improvement in the present technology is to modify an authoritative database to expose the guaranteed clock value via an application programming interface (API) or to report the guaranteed clock value regularly to the cache.

In some embodiments the disclosed technology is deployed in the context of a content management system having object synchronization capabilities and collaboration features, among others. An example system 100 configuration is shown in FIG. 1, which depicts content management system 102 interacting with client device 134.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g., various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 132. Objects database 132 can also include a subject account identifier that identifies the subject IDs that have access to the object.

In some embodiments, objects database 132 can be broken into a plurality of tables, indexes and other data structures.

Each of the various storages/databases such as object storage 124, object directory 126, objects database 132, and metadata database 130 can be comprised of more than one such storage or database and can be distributed over many devices and locations. Other configurations are also possible. For example, data from object storage 124, object directory 126, objects database 132, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 132. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 124.

While the directory structure in which an account views objects does not correlate to storage locations of the objects at content management system 102, the directory structure can correlate to storage locations of the objects on client device 134 depending on the file system used by client device 134.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 132. Objects database 132 can include the object ID of the object and can optionally include a description of the change or access action along with a time stamp or version number and any other relevant data. Objects database 132 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 132.

Object Synchronization

Another feature of content management system 102 is synchronization of objects with at least one client device 134. Client device(s) 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example, a mobile device might have a local file system accessible by multiple applications resident thereon, or might access content management system 102 via a web browser. As such, the form factor should not be considered limiting when considering client 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client devices 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to objects between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 134.

Objects can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 132, metadata database 130, object directory 126, object storage 124, subject database 122, etc. as appropriate.

When synchronizing from content management system 102 to client device 134, data regarding a mount, modification, addition, deletion, move of an object recorded in objects database 132 can trigger a notification to be sent to client device 134 using notification service 108. When client device 134 is informed of the change, client device 134 can make a request for changes listed in objects database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 134 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client device 134 attempts to access the object, client synchronization service 138 can retrieve the data of the object from content management system 102 and provide the complete object to client device 134. This approach can provide significant space and bandwidth savings while still providing full access to a subject's objects on content management system 102.

While the synchronization embodiments addressed above referred to client device 134 and a server of content management system 102, it should be appreciated by those of ordinary skill in the art that a user account can have any number of client devices 134 all synchronizing objects with content management system 102, such that changes to an object on any one client device 134 can propagate to other client devices 134 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share an object within content management system 102 sharing service 114 can add associate a subject ID of a team or of one or more subject accounts with a content item in objects database 132 associated with the object, thus granting the added subject account(s) access to the object. Sharing service 114 can also remove subject IDs from being permitted to access a content item in objects database 132 to restrict a subject account's access to the object. Sharing service 114 can record object identifiers, subject identifiers given access to an object, and access levels in objects database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 132. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 132 that a URL to the object has been created. In some embodiments, an entry into objects database 132 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 132 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g., a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 134 is accessing the object. Notifications service 108 can then notify all client devices of other subjects having access to the same object of the presence of the subject of client device 134 with respect to the object.

In some embodiments, content management system 102 can report a history of subject interaction with a shared object. Collaboration service 112 can query data sources such as metadata database 130 and objects database 132 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client device 134. In embodiments wherein an object is accessed by a native application stored and executed on client device 134, where the object is in a designated location of the file system of client device 134 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, which resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
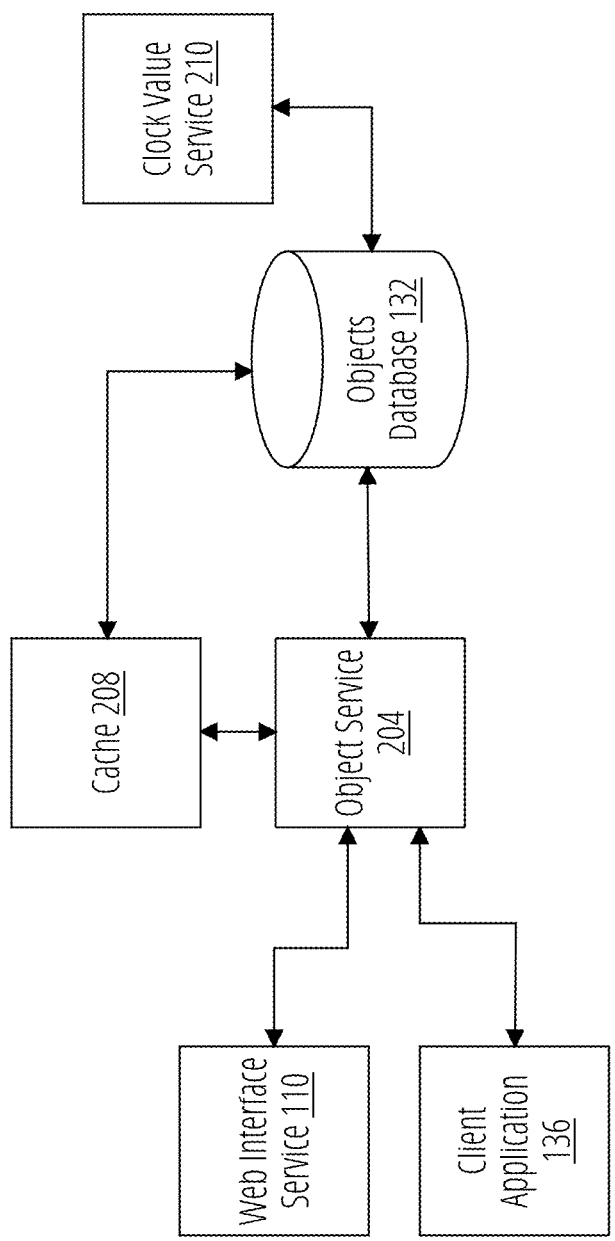
FIG. 2 illustrates an example system for providing a cache with guarantee of current data in accordance with some aspects of the present technology.

FIG. 2 illustrates an example system for providing a cache with guarantee of current data in accordance with some aspects of the present technology. Although FIG. 2 illustrates a particular arrangement of logical components, it should be appreciated that this is for explanatory purposes only. Components that are illustrated as separate might be integrated with other objects. The arrows in the figure are also for purposes of explanation and indicate that the components are in communication with each other, but such communication paths or bi-directional communication paths might not actually exist. Further, it should be appreciated that the arrows reflect communications and are not limited to the flow of data read from the cache 208 or objects database 132.

The system illustrated in FIG. 2 includes a web interface service 110 and a client application 136, which can provide interfaces for a user account to interact with the content management system 102. For example, a user account can interact with the web interface service 110 or client application 136 to request an object or information about an object from the content management system 102.

The request for information can be sent to the object service 204. The object service 204 is an application layer that can provide an interface to the cache 208 and objects database 132. For example, the object service 204 may offer APIs that can be called by the web interface service 110, client application 136, other services of the content management system, or even third-party services. As will be described further herein, the object service 204 can determine whether a query can be validly served by the cache 208 or whether the query should be directed towards the objects database 132.

As illustrated in FIG. 2, the objects database 132 can interact with a clock value service 210. While the clock value service 210 is shown as separate from objects database 132, the clock value service 210 can be part of the objects database 132. The clock value service 210 can serve to keep track of a guaranteed clock value. As described herein, the guaranteed clock value can be reported to the cache 208 so that the cache and object service 204 can ensure any queries to cache 208 are made for data that has occurred prior to the guaranteed clock value. And, in this way, the cache 208 can ensure that any data that it returns is up to date as of the requested clock value.

The cache 208 can also interface with objects database 132 to perform a data invalidation technique whereby the cache 208 repeatedly attempts to determine what data within the cache might no longer be valid due to changes to that data in the authoritative database. This technique is addressed in further detail herein.

The objects database 132 is provided as an example of an authoritative database. As referred to herein, an authoritative database is a database, a replica of a database, or another cache that is up-to-date as of a given guaranteed clock value and includes the data required by the cache 208.

Figure 3:
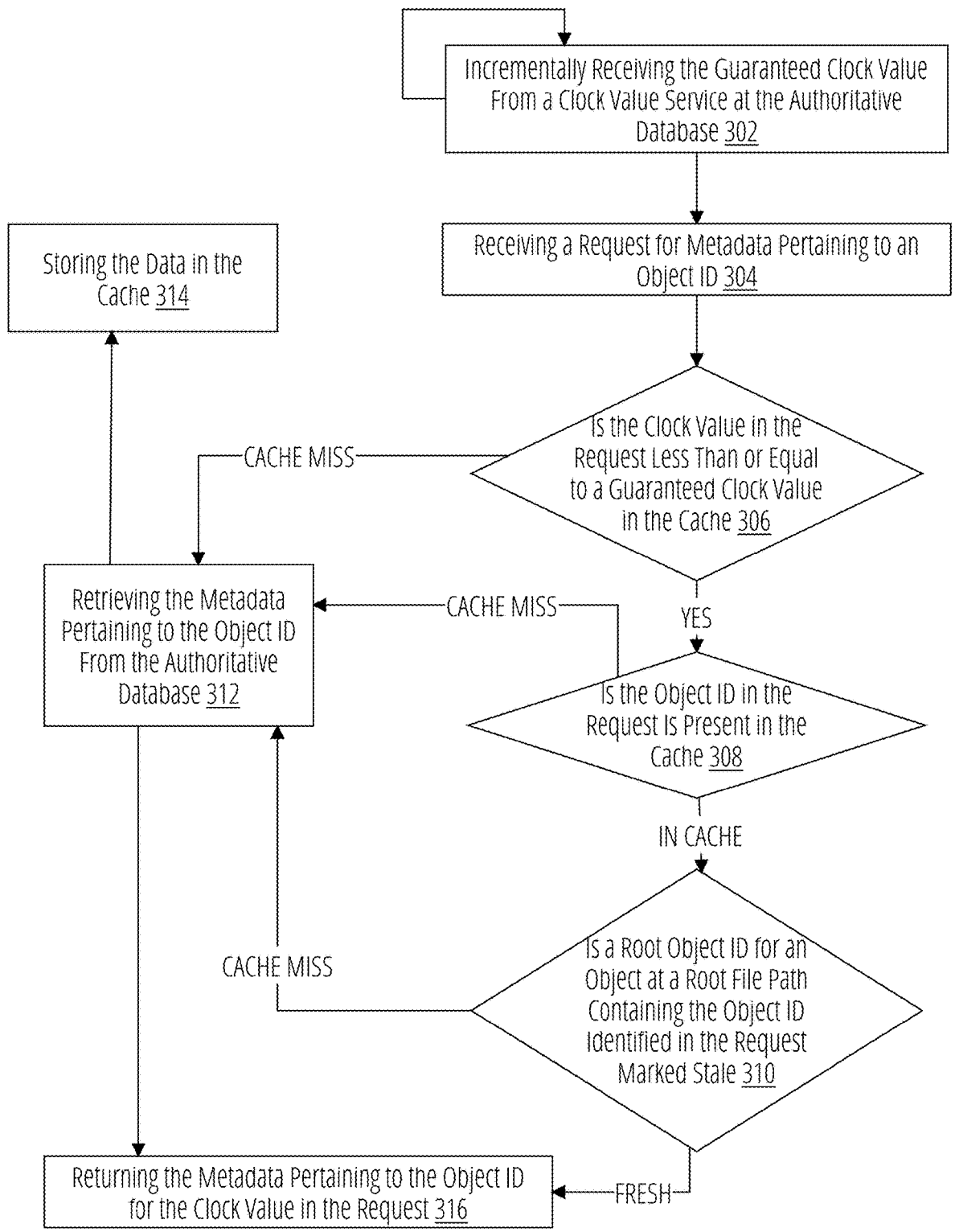
FIG. 3 illustrates an example routine for determining whether requested data can be returned from a cache with a guarantee of current data in accordance with some aspects of the present technology.
Figure 4A:
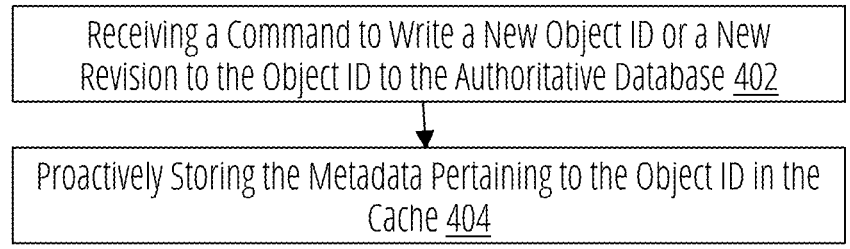
FIG. 4A illustrates an example routine for updating the cache based on write commands in accordance with some aspects of the present technology.
Figure 4B:
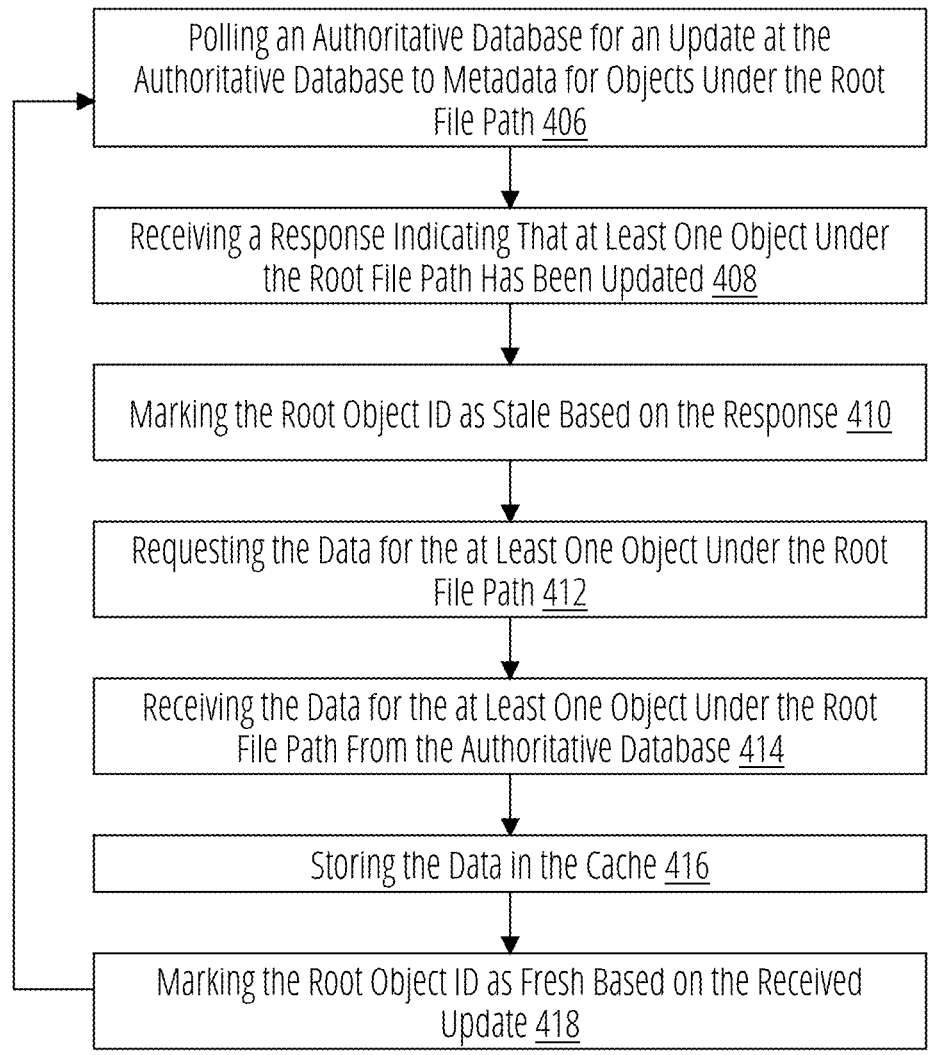
FIG. 4B illustrates an example routine for identifying data within the cache as stale and refreshing the data in the cache in accordance with some aspects of the present technology.

A further description of the system illustrated in FIG. 2 will become apparent through the descriptions of FIG. 3, FIG. 4A, and FIG. 4B to follow.

FIG. 3 illustrates an example routine for determining whether requested data can be returned from a cache with a guarantee of current data in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As introduced above, the present technology utilizes two techniques together to guarantee that data from returned from a cache is current data. The first technique uses a guaranteed clock value. The second technique is a data invalidation technique. The method illustrated in FIG. 2 demonstrates how these techniques work together.

While FIG. 3 attributes the functions described herein to the cache 208, those of ordinary skill in the art will appreciate that these functions might be performed by the object service 204 or a combination of the object service 204 and cache 208.

According to some examples, the method includes incrementally receiving the guaranteed clock value from a clock value service at the authoritative database at block 302. For example, the cache 208 illustrated in FIG. 2 may incrementally receive the guaranteed clock value from clock value service 210 at the authoritative database (e.g., objects database 132). The guaranteed clock value is a most current clock value that the authoritative database has reported to the cache. The guaranteed clock value is not the same as a recent clock value, but rather the guaranteed clock value is a clock value for which all changes that have occurred before it has been written to the authoritative database. Any query having a clock value greater than the guaranteed clock value is invalid.

Since changes occur so quickly at the objects database 132, it is possible that write to the objects database 132 can begin at a time, t=x, but not complete until a time t=x+2. Thus, a database is not always up-to-date as of a current time. Due to the latency of some operations, there needs to be a clock value, i.e., the guaranteed clock value, which is a time in which all writes to the objects database 132 need to have been completed before the guaranteed clock value is incremented. Any operations that take too long may fail and need to be repeated based on a refreshed guaranteed clock value. But operations can complete writing to the database in any order between two sequential guaranteed clock values. Because of this property, the authoritative database, i.e., objects database 132 is only fully up-to-date for a clock value that is prior to or equal to a current guaranteed clock value.

At least with respect to an authoritative database such as the objects database 132 where a relative time ordering of write operations is important, the guaranteed clock value can be used to increment a hybrid logical clock. A hybrid logical clock is a synchronization mechanism used in distributed systems to establish a consistent and ordered view of events across multiple nodes or processes. It combines the concepts of logical clocks and physical clocks to provide a reliable and accurate notion of event ordering in a distributed environment. In a distributed system, where multiple nodes or processes operate independently, maintaining a global sense of time is challenging due to clock drift, network delays, and other factors. Logical clocks help address this issue by assigning logical timestamps to events based on their causal relationship. However, they may lack synchronization with physical time. A hybrid logical clock addresses this limitation by incorporating both logical and physical time references. It achieves synchronization by leveraging logical timestamps for local events within a process or node and periodically synchronizing these timestamps with physical time references. This synchronization allows for accurate event ordering across different nodes or processes.

Block 302 reflects that the cache 208 repeatedly receives incremental updates in the guaranteed clock value, such that all data that is valid as of that clock value in the cache is guaranteed to be the most recent data in the authoritative database (due to the data invalidation technique for cache data illustrated in FIG. 4B, and being up-to-date as of the guaranteed clock value).

When a user account requests data pertaining to an object ID, the web interface service 110, client application 136, or other service can make the request to the object service 204.

In some embodiments, the request is made by calling an API of the object service 204. If the request is for data that may be stored in the cache 208, the object service 204 can request the metadata pertaining to an object ID from the cache 208. In turn, the cache can receive this request as described with respect to block 304.

For example, the cache 208 illustrated in FIG. 2 may receive a request for metadata pertaining to an object ID. The request also includes a clock value or range of clock values for when the data that is requested is relevant, along with the object IDs for which the data is requested. In some embodiments, the clock value indicates an approximate time in which the metadata pertaining to the object ID was current.

As addressed above, the system might utilize hybrid logical clock values, and in such instances, the clock value in the request is a hybrid logical clock value.

An example of a common request that can be served from the cache 208 is to distribute an updated block list for an object. For example, assume a first client application 136 makes an edit to an object that is shared with one or more second client applications 136 (of the same user account or other user accounts). The server synchronization service 104 can inform the client applications 136 that an object ID has an update at a given hybrid logical clock value. Those client applications 136 can then request the updated block list making up the edited object, which can be served from the cache. Since potentially many client applications 136 could be requesting this updated data, it is an good use of the cache 208 to provide this data rather than the objects database 132, which requires greater time and resources to respond to a query.

As addressed above, a first technique to guarantee the validity of the data in the cache is to ensure that the request pertains to data that the cache 208 can include. Data that is too recent might not be stored in the cache yet. According to some examples, the method includes determining that the clock value in the request is less than or equal to a guaranteed clock value in the cache at decision block 306. For example, the cache 208 illustrated in FIG. 2 may determine that the clock value in the request is less than or equal to a guaranteed clock value in the cache. If the clock value in the request is less than or equal to the guaranteed clock value, this indicates that the cache at least has a record of whether or not its data is current through the clock value in the request, and the method proceeds to decision block 308, but if the clock value is too recent, the cache 208 returns a cache miss and the method proceeds to block 312.

According to some examples, the method includes determining whether the object ID in the request is present in the cache at decision block 308. For example, the cache 208 illustrated in FIG. 2 may determine whether the object ID in the request is present in the cache. If the object ID is in the cache, the method proceeds to decision block 310, but if the object ID is not in the cache, the cache 208 returns a cache miss, and the method proceeds to block 312.

According to some examples, the method includes determining whether a root object ID for an object at a root file path containing the object ID identified in the request is marked stale at decision block 310. For example, the cache 208 illustrated in FIG. 2 may determine whether a root object ID for an object at a root file path containing the object ID identified in the request is marked stale. The method by which an object ID is marked as stale is depicted in FIG. 4B. As will be addressed further with respect to FIG. 4B, the reason the method looks to see if a root object ID is marked stale instead of checking to see if the data for the object ID is itself stale is because the data invalidation method described in FIG. 4B relies on the authoritative database reporting any changes under a root object ID at the root object ID level. This can be more efficient than receiving reports on every object ID that is changed. Additionally, a change at the parent object level, like a root object, can cause changes to the object ID (like a directory structure has changed at the root object level), and as such, the whole tree under the root object ID is marked stale together.

In some embodiments, even if the root object ID has been marked stale, the cache might still be able to return data. While FIG. 3 has mostly been addressed in the context of a clock value in the request being for a recent time, it can be the clock value could be for an older time. The cache 208 can include HLC values for when data under a root object ID was last known to be current. This could be the HLC for the time in which the data under the root object ID was refreshed. Additionally, the cache can include a HLC value for a time when data under that root object ID was first stored and watched by the cache. Collectively, these two HLC values can define a period for when the cache knows that the data for objects under the root object ID are correct, even if the data might be stale now. Said another way, the cache 208 can have an indication that the root object ID is stale, and also have HLC values for when the data for the root object ID was known to be correct. Therefore, a cache hit can still be returned even if the root object ID is currently stale, if the clock value in the request is for a time in the range of times for when the data for the root object ID was known to be correct.

If the requested data is marked as stale, the cache 208 returns a cache miss and the method proceeds to block 312. If the data is not marked stale, that means that the cache has the requested data, and we can be sure that the requested data that is in the cache is current because it has not been marked stale, and because we know that the cache is updated for changes to the authoritative database through the guaranteed clock value, which is more recent that the data we are reading from the cache.

According to some examples, the method includes returning the metadata pertaining to the object ID for the clock value in the request at block 316. For example, the cache 208 illustrated in FIG. 2 may return the metadata pertaining to the object ID for the clock value in the request.

The metadata stored by the cache can include any data pertaining to an object. Some examples of the metadata stored by the cache include the object ID for the object, the clock value associated with the most recent change to the object, and object retrieval information (e.g., a blocklist of blocks making up the object). In some embodiments, the metadata stored by the cache also includes a root object ID for the object ID. In some embodiments, the metadata stored by the cache can include a complete copy of up-to-date metadata for the object as of a given clock value, and can also include deltas. Deltas are the portions of the metadata that have changed. For example, the cache can include a full list of blocks that make up the current object (e.g., blocks 101, 102, 110), and the delta can identify a specific block that changed (e.g., block 103→block 110 @ hybrid logical clock value=t). Of course, it will be appreciated by those of skill in the art that other data can be stored as well.

If, however, the clock value in the request is more recent than the guaranteed clock value, or the object ID isn't represented in the cache 208, or the data pertaining to the object ID might not be current, the cache 208 will return a cache miss at any of decision block 306, decision block 308, or decision block 310. When there is a cache miss, the requested data needs to be retrieved from the authoritative database, e.g., objects database 132.

According to some examples, the method includes retrieving the metadata pertaining to the object ID from the authoritative database at block 312. For example, the object service 204 illustrated in FIG. 2 can retrieve the requested data from the authoritative database, e.g., objects database 132 to provide to the web interface service 110/client application 136.

And the cache 208 can also retrieve the requested data from the authoritative database. And to update the cache, the method includes storing the data in the cache at block 314. For example, the cache 208 illustrated in FIG. 2 may store the data in the cache. In some embodiments, it is not just the data from the requested object ID that resulted in a cache miss that is updated in the cache. In addition to the data for pertaining to a particular object(s), the cache can request up-to-date data for all objects under a root object of the object ID with the new data. This can be helpful since often it is not just data for the object that is requested, but also other objects in the same branch of a directory tree (objects under the root).

FIG. 4A illustrates an example routine for updating the cache based on write commands in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving a command to write a new object ID or a new revision to the object ID to the authoritative database at block 402. For example, the object service 204 illustrated in FIG. 2 may receive a command to write a new object ID or a new revision to the object ID to the authoritative database.

It has been observed that one common event that leads to requests for updated data is that a new object or a change to an object has been written to the objects database 132. This makes sense in the example of a first client application 136 that makes an edit to an object that is shared with one or more second client applications 136 (of the same user account or other user accounts). The server synchronization service 104 can inform the client applications 136 that an object ID has an update at a given hybrid logical clock value. Those client applications 136 can then request the updated block list making up the edited object, which can be served from the cache. Since potentially many client applications 136 could be requesting this updated data, it is a good use of the cache 208 to provide this data rather than the objects database 132, which requires greater time and resources to return a response to a query.

Accordingly, when new writes to the authoritative database (e.g., the objects database 132) occur, the method includes proactively storing the metadata pertaining to the object ID in the cache at block 404. For example, the object service 204 illustrated in FIG. 2 may proactively store the metadata pertaining to the object ID in the cache in anticipation of other client applications 136 requesting the new data. In this way, it is more likely that a cache hit will occur as opposed to a cache miss that will require querying the authoritative database.

In some embodiments, it is not just the data from the new write that is proactively stored in the cache 208. In addition to the data for the new write pertaining to a particular object(s), the cache can request up-to-date data for all objects under a root object of the object ID with the new data. This can be helpful since often it is not just data for the object the new write that is requested, but also other objects in the same branch of a directory tree (objects under the root).

FIG. 4B illustrates an example routine for identifying data within the cache as stale and refreshing the data in the cache in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Referring again to the two techniques utilized together by the present technology to guarantee that data returned from a cache is current data: The first technique uses a guaranteed clock value. The second technique is a data invalidation technique. The method illustrated in FIG. 4B demonstrates the data invalidation technique and the refreshing of the data in the cache that has become invalid (i.e., stale).

According to some examples, the method includes polling an authoritative database for an update at the authoritative database to metadata for objects under the root file path at block 406. For example, the cache 208 illustrated in FIG. 2 may poll an authoritative database (e.g., objects database 132) for an update at the authoritative database to metadata for objects under the root file path.

According to some examples, the method includes receiving a response indicating that at least one object under the root file path has been updated at block 408. For example, the cache 208 illustrated in FIG. 2 may receive a response indicating that at least one object has been updated under the root file path. For example, whenever a change is made to an object, this can result in the objects database 132 reporting to the cache that a root object ID has been associated with changed data. The response includes a clock value for the update under the root file path.

According to some examples, the method includes marking the root object ID as stale based on the response at block 410. For example, the cache 208 illustrated in FIG. 2 may mark the root object ID as stale based on the response. This results in invalidating, or marking as stale, objects in a path under the root object ID.

A reason the method reports changes at a root object ID when a change might have occurred to a specific object ID under the root ID is that this method can be more efficient than receiving reports on every object ID. Additionally, a change at the parent object level, like a root object, can cause changes to the object ID (like a directory structure has changed at the root object level) and as such, the whole tree under the root object ID is marked stale together. For these reasons it makes sense to treat all objects under a root object ID together. If one object is to be marked stale, all objects under that root object ID are marked stale.

Once objects are marked as stale, the cache needs to be updated with fresh data. According to some examples, the method includes requesting the data for the at least one object under the root file path at block 412. For example, cache 208, illustrated in FIG. 2, may request data from the authoritative database for at least one object under the root file path.

According to some examples, the method includes receiving the data for at least one object under the root file path from the authoritative database at block 414. For example, the cache 208 illustrated in FIG. 2 may receive the data for at least one object under the root file path from the objects database 132.

According to some examples, the method includes storing the data in the cache at block 416. For example, the cache 208 illustrated in FIG. 2 may store the refreshed data in the cache 208.

According to some examples, the method includes marking the root object ID as fresh based on the received update at block 418. For example, the cache 208 illustrated in FIG. 2 may mark the root object ID as fresh based on the received update, thereby making it possible for the cache to again serve data for the object IDs under the root object ID.

Although, the present description has referred to the authoritative database (e.g., objects database 132) as a unitary database, those of skill in the art will appreciate that many cloud-based databases are split into shards. The objects database 132 can also be split into shards. In such embodiments, the shards can have a respective instance of the cache that is responsible for objects stored on that shard.

Figure 5:
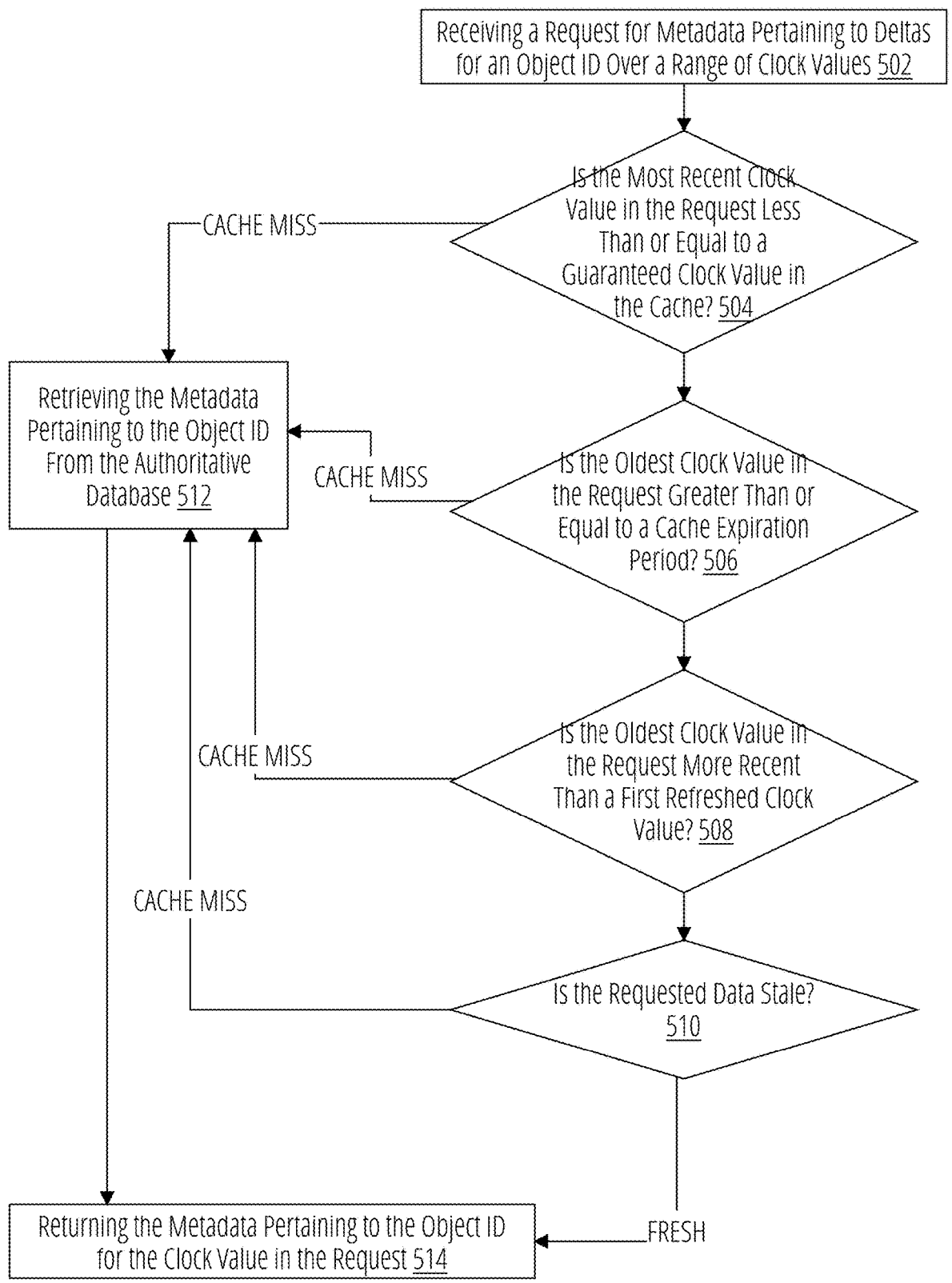
FIG. 5 illustrates an aspect of the subject matter in accordance with one embodiment.

FIG. 5 illustrates an example routine for determining whether requested data can be returned from a cache with a guarantee of current data in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

FIG. 5 is similar in some ways to FIG. 3, however FIG. 5 addresses a request for deltas that occurred during a range of clock values, whereas FIG. 3 addresses a request for any data at a specified clock value. While both figures share a certain amount of similarity, the request in FIG. 5 requires a few extra determinations to ensure that the all of the data to be served in response to the request is current in the cache.

While FIG. 5 lacks some analogous blocks to those in FIG. 3—for example, there is no analogous block to block 302, block 314, or decision block 308; it should be appreciated that this is just to simplify the illustration. Thus FIG. 5 should be read as if it adds extra details to the data stored in the cache and extra details about the functioning of the cache as described in FIG. 3.

While FIG. 5 attributes the functions described herein to the cache 208, those of ordinary skill in the art will appreciate that these functions might be performed by the object service 204 or a combination of the object service 204 and cache 208.

According to some examples, the method includes receiving a request for metadata pertaining to deltas for an object ID over a range of clock values at block 502. For example, the cache 208 illustrated in FIG. 2 may receive a request for metadata pertaining to deltas for an object ID over a range of clock values. This is one common type of request that client applications 136 make of the objects database 132. In these requests the client application 136 requests all changes (deltas) make to an object over a time range.

According to some examples, the method includes determining if the most recent clock value in the request is less than or equal to a guaranteed clock value in the cache at decision block 504. Decision block 504 is substantially similar to that described with respect to decision block 306. The main difference between decision block 504 and decision block 306 is that the request includes a range of clock values in the request, and at decision block 504 evaluates the most recent clock value to make sure that the cache is up-to-date through the most recent value.

FIG. 5 adds a detail to FIG. 3 that the cache also needs to be current for the oldest clock value in the range of clock values in the request. According to some examples, the method includes determining if the oldest clock value in the request is greater than or equal to a cache expiration period at decision block 506. For example, the cache 208 illustrated in FIG. 2 may determine whether the oldest clock value in the request is greater than or equal to a cache expiration period. In some embodiments, the cache might only store data for a certain amount of time before it is considered expired and needs to be refreshed. For, example, the cache can be configured to remove data that is older than a cache expiration period. For example, any data that is older than 7-days can be considered expired or is deleted. If the oldest clock value in the request is greater than or equal to (i.e., older than) a cache expiration period a cache miss is returned.

Where decision block 504 and decision block 506 serve to determine if the cache is generally up-to-date for clock values in the request and could possibly serve a response to the request, decision block 508 and decision block 510 focus on whether the specific data for the object ID identified in the request is present an up-to-date in the cache. Since the goal of this request is to serve up all deltas that occurred during the range of clock values in the request, the cache needs to determine if it has been watching for changes to the object continuously for the entire range of clock values in the request. If it has not, then even if the cache is up-to-date as of the guaranteed clock value, the cache might not be aware of deltas that occurred before the cache was watching changes for the object ID. At each update, the cache can store the most recent full set of metadata and can keep track of deltas as changes occur. As updates to an object ID occur, the cache continues to keep a fully copy of the most recent metadata, and incrementally adds timestamps (HLC values) for delta values that show what metadata was specifically changed at that time stamp.

According to some examples, the method includes determining if the oldest clock value in the request is more recent than the first refreshed clock value at decision block 508. For example, the cache 208 illustrated in FIG. 2 may determine whether the oldest clock value in the request is more recent than the first refreshed clock value. If the requested change is older than the time in which the cache started watching the object ID named in the request, the cache returns a cache miss because it can not be sure it has all deltas for the entire period covered by the clock values in the request.

According to some examples, the method includes determining whether a root object ID for an object at a root file path containing the object ID identified in the request is stale at decision block 510. For example, the cache 208 illustrated in FIG. 2 may determine whether a root object ID for an object at a root file path containing the object ID identified in the request is stale. Just as addressed with respect to FIG. 3, even if the root object ID has been marked stale, the cache might still be able to return data if clock values in the request pertain to past data that is known to be correct, even if the most current data for the root object ID is currently stale.

In some embodiments, even if the root object ID has been marked stale, the cache might still be able to return data. As addressed above, the cache 208 can include HLC values for when data under a root object ID was last known to be current. This could be the HLC for the time in which the data under the root object ID was refreshed. Additionally, the cache can include a HLC value for a time when data under that root object ID was first stored and watched by the cache. Collectively, these two HLC values can define a period for when the cache knows that the data for objects under the root object ID are correct, even if the data might be stale now. Said another way, the cache 208 can have an indication that the root object ID is stale, and also have HLC values for when the data for the root object ID was known to be correct. Therefore, a cache hit can still be returned even if the root object ID is currently stale if the clock values in the request are for a time in the range of times for when the data for the root object ID was known to be correct.

If the requested data falls outside a range of clock values for which the data in the cache is known to be correct and complete, the cache 208 returns a cache miss and progresses to block 512, but if the requested data is correct and complete, the method returns the data at block 514.

According to some examples, the method includes retrieving the metadata pertaining to the object ID from the authoritative database at block 512.

According to some examples, the method includes returning the metadata pertaining to the object ID for the clock values in the request at block 514. For example, the cache 208 illustrated in FIG. 2 may return the metadata pertaining to the object ID for the clock value in the request. The metadata stored by the cache includes the object ID for the object, the clock value associated with the most recent change to the object, and object retrieval information. The object retrieval information includes the requested delta values for the object.

Figure 6:
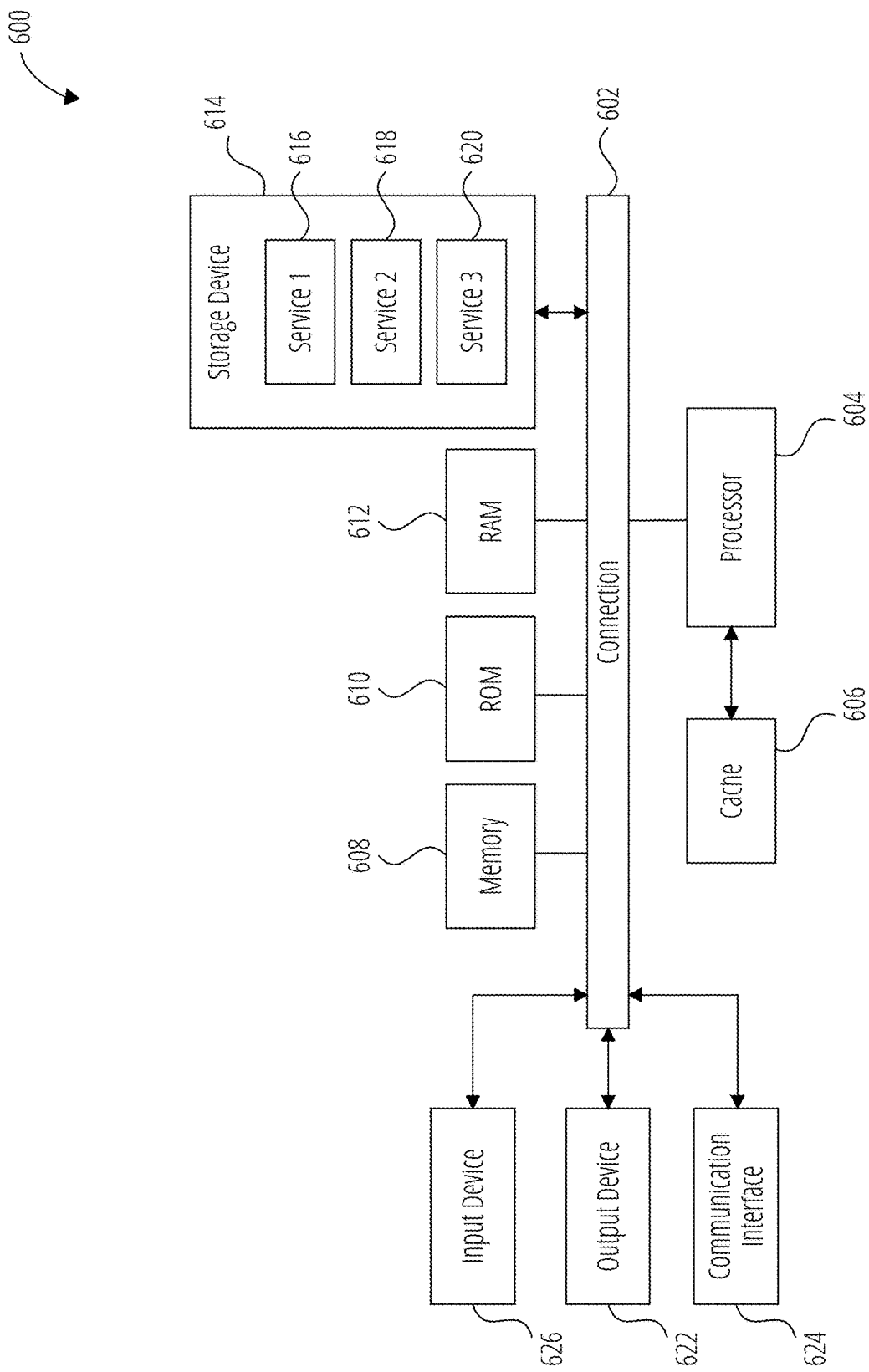
FIG. 6 shows an example of a system for implementing certain aspects of the present technology.

FIG. 6 shows an example of computing system 600, which can be for example any computing device making up objects database 132, object service 204, or cache 208, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects of the present technology include:

Aspect 1. A method comprising: receiving, by a cache, a request for metadata pertaining to an object ID, the request including a clock value, the clock value indicating an approximate time in which the metadata pertaining to the object ID was current, the clock value being a hybrid logical clock value; determining, by the cache, that the clock value in the request is less than or equal to a guaranteed clock value in the cache which indicates that the cache is current through the clock value in the request; determining, by the cache, that a root object ID for an object at a root file path containing the object ID identified in the request is not marked stale; and returning, by the cache, the metadata pertaining to the object ID for the clock value in the request.

Aspect 2. The method of Aspect 1, further comprising: by the cache, for an update at the authoritative database to metadata for objects under the root file path, for example, the authoritative database is the objects database; by the cache, indicating that at least one object under the root file path has been updated, wherein the response includes a clock value for a most recent update under the root file path; marking, by the cache, the root object ID as stale based on the response.

Aspect 3. The method of any of Aspects 1 to 2, further comprising: requesting, by the cache, the update to the at least one object under the root file path; receiving, by the cache, the update to the at least one object under the root file path from the authoritative database; and marking, by the cache, the root object ID as fresh based on the received update.

Aspect 4. The method of any of Aspects 1 to 3, further comprising: incrementally receiving, by the cache, the guaranteed clock value from a clock value service at the authoritative database.

Aspect 5. The method of any of Aspects 1 to 4, wherein the metadata stored by the cache includes the object ID for the object, the clock value associated with the most recent change to the object, and object retrieval information, the object retrieval information including a block list of blocks making up the object, where the blocks in the block list can be requested from the authoritative database.

Aspect 6. The method of any of Aspects 1 to 5, wherein the metadata stored by the cache includes a root object ID for the object.

Aspect 7. The method of any of Aspects 1 to 6, further comprising: determining that the object ID in the request is not present in the cache; retrieving the metadata pertaining to the object ID from the authoritative database.

Aspect 8. The method of any of Aspects 1 to 7, further comprising: receiving a command to write a new object ID or a new revision to the object ID to the authoritative database; proactively storing the metadata pertaining to the object ID in the cache.

Aspect 9. The method of any of Aspects 1 to 8, wherein the authoritative database is split amongst a plurality of shards, the shard having a respective instance of the cache that is responsible for objects stored on that shard.

Aspect 10. The method of any of Aspects 1 to 9, wherein the cache is located at the content management system.

Aspect 11. The method of any of Aspects 1 to 10, wherein the cache is located at a client device, in such embodiments, the cache can be a single consolidated cache for the objects associated with the user account such that a single cache stores data for all objects associated with the user account irrespective of which shard the objects are stored on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    receiving, by a cache, a request for metadata pertaining to an object ID, the request including a clock value, the clock value indicating an approximate time in which the metadata pertaining to the object ID was current;
    determining, by the cache, that the clock value in the request is less than or equal to a guaranteed clock value in the cache, wherein a determination that the clock value in the request is less than or equal to the guaranteed clock value in the cache indicates that the cache is current since the clock value in the request;
    determining, by the cache, that a root object ID for an object at a root file path containing the object ID identified in the request is not marked stale; and
    returning, by the cache, the metadata pertaining to the object ID for the clock value in the request.

2. The method of claim 1, further comprising:
    polling an authoritative database, by the cache, for an update at the authoritative database to metadata for objects under the root file path;
    receiving a response, by the cache, indicating that at least one object under the root file path has been updated, wherein the response includes an update clock value for a most recent update under the root file path; and marking, by the cache, the root object ID as stale based on the response.

3. The method of claim 1, further comprising:
requesting, by the cache, an update to at least one object under the root file path;
receiving, by the cache, the update to the at least one object under the root file path from an authoritative database; and
marking, by the cache, the root object ID as fresh based on the received update.

4. The method of claim 1, further comprising:
incrementally receiving, by the cache, the guaranteed clock value from a clock value service at an authoritative database.

5. The method of claim 1, wherein the metadata stored by the cache includes the object ID for the object, the clock value associated with a most recent change to the object, and object retrieval information.

6. The method of claim 1, further comprising:
receiving a command to write a new object ID or a new revision to the object ID to an authoritative database; and
proactively storing the metadata pertaining to the object ID in the cache.

7. The method of claim 5, wherein the metadata stored by the cache includes the root object ID for the object.

8. The method of claim 1, further comprising:
determining that the object ID in the request is not present in the cache; and
retrieving the metadata pertaining to the object ID from an authoritative database.

9. A computing system comprising:
at least one processor; and
a memory storing instructions that, when executed by the at least one processor, configure the system to:
receive a request for metadata pertaining to an object ID, the request including a clock value;
determine that the clock value in the request is less than or equal to a guaranteed clock value, wherein a determination that the clock value in the request is less than or equal to the guaranteed clock value in a cache indicates that the cache is current through since the clock value in the request;
determine that a root object ID for an object at a root file path containing the object ID identified in the request is not marked stale; and
return the metadata pertaining to the object ID for the clock value in the request.

10. The computing system of claim 9, wherein the instructions further configure the system to:
poll an authoritative database for an update at the authoritative database to metadata for objects under the root file path;
receive a response indicating that at least one object under the root file path has been updated, wherein the response includes an update clock value for a most recent update under the root file path; and
mark the root object ID as stale based on the response.

11. The computing system of claim 9, wherein the instructions further configure the system to:
request an update to at least one object under the root file path;
receive the update to the at least one object under the root file path from an authoritative database; and
mark the root object ID as fresh based on the received update.

12. The computing system of claim 9, wherein the instructions further configure the system to:
incrementally receive the guaranteed clock value from a clock value service at an authoritative database.

13. The computing system of claim 9, wherein the metadata stored by the cache includes the object ID for the object, the clock value associated with a most recent change to the object, and object retrieval information.

14. The computing system of claim 9, wherein the instructions further configure the system to:
receive a command to write a new object ID or a new revision to the object ID to an authoritative database; and
proactively store the metadata pertaining to the object ID in the cache.

15. A computer-readable storage medium that is non-transitory, the computer-readable storage medium comprising instructions that when executed by at least one processor, cause the at least one processor to:
receive a request for metadata pertaining to an object ID, the request including a clock value;
determine that the clock value in the request is less than or equal to a guaranteed clock value, wherein a determination that the clock value in the request is less than or equal to the guaranteed clock value in a cache indicates that the cache is current since the clock value in the request;
determine that a root object ID for an object at a root file path containing the object ID identified in the request is not marked stale; and
return, by the cache, the metadata pertaining to the object ID for the clock value in the request.

16. The computer-readable storage medium of claim 15, wherein the instructions further configure the at least one processor to:
poll an authoritative database for an update at the authoritative database to metadata for objects under the root file path;
receive a response indicating that at least one object under the root file path has been updated, wherein the response includes an update clock value for a most recent update under the root file path; and
mark the root object ID as stale based on the response.

17. The computer-readable storage medium of claim 15, wherein the instructions further configure the at least one processor to:
request an update to at least one object under the root file path;
receive the update to the at least one object under the root file path from an authoritative database; and
mark the root object ID as fresh based on the received update.

18. The computer-readable storage medium of claim 15, wherein the instructions further configure the at least one processor to:
incrementally receive the guaranteed clock value from a clock value service at an authoritative database.

19. The computer-readable storage medium of claim 15, wherein the metadata stored by the cache includes the object ID for the object, the clock value associated with a most recent change to the object, and object retrieval information.

20. The computer-readable storage medium of claim 15, wherein the instructions further configure the at least one processor to:
receive a command to write a new object ID or a new revision to the object ID to an authoritative database; and proactively store the metadata pertaining to the object ID in the cache.

\* \* \* \* \*